（12）United States Patent
Sakamoto

(10) Patent No.: US 9,897,760 B2
(45) Date of Patent: Feb. 20, 2018

(54) OPTICAL DEVICE, OPTICAL MODULATOR, AND METHOD FOR MANUFACTURING OPTICAL DEVICE

(71) Applicant: FUJIKURA LTD., Tokyo (JP)

(72) Inventor: Shinichi Sakamoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/450,155

(22) Filed: Mar. 6, 2017

(65) Prior Publication Data

US 2017/0299815 A1    Oct. 19, 2017

(30) Foreign Application Priority Data

Apr. 19, 2016  (JP) ................................. 2016-083446

(51) Int. Cl.
    G02B 6/30    (2006.01)
    G02B 6/42    (2006.01)
    G02F 1/225   (2006.01)
    G02F 1/21    (2006.01)

(52) U.S. Cl.
    CPC ............. *G02B 6/30* (2013.01); *G02B 6/4267* (2013.01); *G02F 1/2257* (2013.01); *G02F 2001/212* (2013.01)

(58) Field of Classification Search
    CPC ....... G02B 6/30; G02B 6/4267; G02F 1/2257; G02F 2001/212
    See application file for complete search history.

(56) References Cited

U.S. PATENT DOCUMENTS

| | | | | |
|---|---|---|---|---|
| 4,474,429 A | * | 10/1984 | Yoldas | ................... G02B 6/245 385/43 |
| 7,298,953 B2 | * | 11/2007 | Loni | ....................... G02B 6/30 248/479 |
| 8,326,100 B2 | | 12/2012 | Chen et al. | |
| 9,046,666 B2 | * | 6/2015 | Yoda | .................... G02B 6/4202 |
| 2004/0240831 A1 | | 12/2004 | Loni et al. | |

FOREIGN PATENT DOCUMENTS

JP    2005-509186 A    4/2005

* cited by examiner

*Primary Examiner* — Ryan Lepisto
(74) *Attorney, Agent, or Firm* — Westerman, Hattori, Daniels & Adrian

(57) ABSTRACT

To provide an optical device which enables both (i) suppression of an increase in production cost and (ii) suppression of an increase in optical loss which increase is caused in accordance with a change in temperature of an external environment. In the optical device, a holding member and an optical fiber are bonded and fixed to each other via a first resin layer which is provided between a holding surface of the holding member and a surface of the optical fiber, and the substrate waveguide and the holding member are bonded and fixed to each other via a second resin layer which is provided between an upper surface of the substrate waveguide and a region (bonding surface 31) of a lower surface of the holding member which region is outside the holding surface.

11 Claims, 5 Drawing Sheets

OPTICAL DEVICE, OPTICAL MODULATOR, AND METHOD FOR MANUFACTURING OPTICAL DEVICE

This Nonprovisional application claims priority under 35 U.S.C. § 119 on Patent Application No. 2016-083446 filed in Japan on Apr. 19, 2016, the entire contents of which are hereby incorporated by reference.

TECHNICAL FIELD

The present invention relates to an optical device which includes a substrate waveguide and an optical fiber connected to the substrate waveguide. The present invention also relates to a method for manufacturing the optical device.

BACKGROUND ART

In the field of optical communications, communication transceivers which transmit and receive an optical signal are facing a demand for size reduction. This is because reduction in size of a communication transceiver allows reducing a space occupied by the communication transceiver as well as suppressing production cost and power consumption of the communication transceiver. In order to meet the demand, vigorous research has been conducted on technology related to an optical integrated circuit in which an optical waveguide (substrate waveguide), a light-emitting device, an optical modulator, and the like are integrally mounted on a semiconductor substrate.

A problem of this optical integrated circuit is that optical loss tends to be increased in a case where the substrate waveguide constituting the optical integrated circuit is connected to an optical fiber.

This is because a refractive index of a semiconductor material constituting the substrate waveguide significantly differs from that of a dielectric material constituting the optical fiber. The significant difference in refractive index between the semiconductor material and the dielectric material results in a significant difference between a mode field of light traveling in the substrate waveguide and a mode field of light traveling in the optical fiber. In such a case where light and another light whose mode fields are significantly different from each other are directly coupled to each other, optical loss increases.

There is known a technique to suppress the increase in optical loss by approximating a mode field of one light to a mode field of the other light with use of, for example, a lensed fiber. The lensed fiber is an optical fiber whose end part is microfabricated to have a shape of, for example, a wedge or a cone. The lensed fiber has a mode field which is gradually converted toward the end part. This arrangement allows suppressing the optical loss which is caused in the case where the substrate waveguide and the optical fiber are connected to each other. In other words, the arrangement enables high coupling efficiency.

CITATION LIST

Patent Literature

[Patent Literature 1]
Japanese Patent Application Publication, Tokuhyo, No. 2005-509186 A (Publication Date: Apr. 7, 2005)

[Patent Literature 2]
U.S. Pat. No. 8,326,100 (Publication Date: Dec. 4, 2012]

SUMMARY OF INVENTION

Technical Problem

However, the optical device including the substrate waveguide and the lensed fiber has another problem that optical loss increases in accordance with a change in temperature of an external environment. The following explains why this problem occurs.

The optical device including the substrate waveguide and the lensed fiber tends to have a very narrow tolerance as compared with an optical device which includes a substrate waveguide and a general optical fiber (an optical fiber whose end part is not microfabricated). However, the optical device including the substrate waveguide and the lensed fiber is manufactured through an adjustment step in which an optical axis of the substrate waveguide and an optical axis of the lensed fiber are aligned to each other and a fixation step in which the lensed fiber aligned to the substrate waveguide is fixed to the substrate waveguide. As such, the optical device has low optical loss immediately after being manufactured.

As fixing means for fixing the lensed fiber to the substrate waveguide, a resin member is often used because of a low cost of the resin member itself as well as simplicity of a step for performing bonding with use of the resin member.

In an optical device in which the lensed fiber is thus fixed to the substrate waveguide with use of the resin member, the resin member expands or shrinks in a case where a temperature of the external environment changes from a temperature at the time of the fixation step. This disturbs the alignment and, accordingly, significantly deteriorates a coupling efficiency between the substrate waveguide and the lensed fiber due to the very narrow tolerance. As a result, the optical loss in the optical device including the substrate waveguide and the lensed fiber significantly increases.

In order to prevent the increase of optical loss in accordance with the change in temperature of the external environment, it is possible to employ an arrangement in which the lensed fiber is fixed to the substrate waveguide without use of the resin member.

For example, Patent Literature 1 discloses in FIG. 1 an optical structure in which an optical fiber is fixed to a silicon substrate constituting a substrate waveguide, without use of a resin member. Specifically, Patent Literature discloses an optical structure in which (1) on a surface of the substrate waveguide, a slot with a width (e.g., 124.8 µm to 124.9 µm) slightly smaller than a diameter (125 µm) of the optical fiber and a depth (70 µm) greater than a radius of the optical fiber is formed by dry etching, (2) the optical fiber is cooled in liquid nitrogen so as to cause the optical fiber to shrink to have a diameter (e.g., 124.65 µm) smaller than the width of the slot, and (3) the optical fiber whose width has become smaller than the width of the slot is inserted in the slot so as to be fixed.

In a case where the temperature of the optical fiber changes from the temperature of liquid nitrogen to a room temperature, the optical fiber which has shrunk expands to have an increased diameter, so that the optical fiber is held (fixed) by side portions of the slot. This technique of fitting two members together with use of a change in size caused by thermal shrinkage (or thermal expansion) is known as shrink-fitting.

Patent Literature 1 also discloses in FIGS. 3 through 6 an optical structure in which an optical fiber is shrink-fitted in a chip which has formed therein a slot similar to the above-described slot, and the chip is fixed onto a silicon substrate with use of a peg. The peg is used for the positioning of the optical fiber relative to the silicon substrate.

Further, Patent Literature 1 discloses in FIG. 7 an optical structure in which an optical fiber is inserted in a slot (width: 126 µm) formed on a surface of a silicon substrate, and in this state, the silicon substrate is thermally oxidized so that the optical fiber is fixed to the silicon substrate. The thermal oxidation causes silicon which constitutes inner walls of the slot to be converted into silicon dioxide, which has a density lower than that of silicon. This results in growth of the inner walls of the slot toward an inner side of the slot, so that the optical fiber is fixed in the slot by silicon dioxide which has grown on the inner walls of the slot.

The optical structures described above allow preventing an optical loss from increasing in accordance with a change in temperature of an external environment. Meanwhile, the optical structures also invite an increase in production cost, since an optical fiber which is molded with high precision and a slot which is formed with high precision are essential in order to suppress the increase in optical loss in these optical structures. In particular, dry etching carried out for the formation of a slot and thermal oxidation carried out for the growth of silicon dioxide involve significantly greater complexity and higher cost as compared with bonding (fixing) with use of a resin member.

The present invention is accomplished in view of the foregoing problem. An object of the present invention is to provide an optical device which enables both (i) suppression of an increase in production cost and (ii) suppression of an increase in optical loss which increase is caused in accordance with a change in temperature of an external environment.

Solution to Problem

In order to attain the object, an optical device in accordance with one aspect of the present invention is an optical device including: a substrate waveguide having an upper surface on which a first recess is provided; a holding member disposed on the upper surface of the substrate waveguide; and an optical fiber having a core, a part of the optical fiber being contained in the first recess so that the core faces a core of the substrate waveguide, the holding member and the optical fiber being bonded and fixed to each other via a first resin layer which is provided between a surface of the optical fiber and a holding surface which is a part of a lower surface of the holding member, the substrate waveguide and the holding member being bonded and fixed to each other via a second resin layer which (i) is provided between the upper surface of the substrate waveguide and a region of the lower surface of the holding member which region is outside the holding surface and (ii) has a coefficient of thermal expansion having a sign identical to that of a coefficient of thermal expansion of the first resin layer.

Further, in order to attain the object, a method, in accordance with one aspect of the present invention, for manufacturing an optical device is a method for manufacturing an optical device which includes: a substrate waveguide having an upper surface on which a first recess is provided; a holding member disposed on the upper surface of the substrate waveguide; and an optical fiber having a core, a part of the optical fiber being contained in the first recess so that the core faces a core of the substrate waveguide, said method comprising: a first bonding step of bonding and fixing the holding member and the optical fiber to each other via a first resin layer which is provided between a surface of the optical fiber and a holding surface which is a part of a lower surface of the holding member; and a second bonding step of bonding and fixing the substrate waveguide and the holding member to each other via a second resin layer which (i) is provided between the upper surface of the substrate waveguide and a region of the lower surface of the holding member which region is outside the holding surface and (ii) has a coefficient of thermal expansion having a sign identical to that of a coefficient of thermal expansion of the first resin layer.

Advantageous Effects of Invention

The present invention makes it possible to provide an optical device which enables both (i) suppression of an increase in production cost and (ii) suppression of an increase in optical loss which increase is caused in accordance with a change in temperature of an external environment.

BRIEF DESCRIPTION OF DRAWINGS (a) of FIG. 1 is a trihedral drawing of an optical device in accordance with Embodiment 1 of the present invention. (b) of FIG. 1 is a perspective view of a holding member included in the optical device illustrated in (a) of FIG. 1.

DESCRIPTION OF EMBODIMENTS

Embodiment 1

Figure 1:
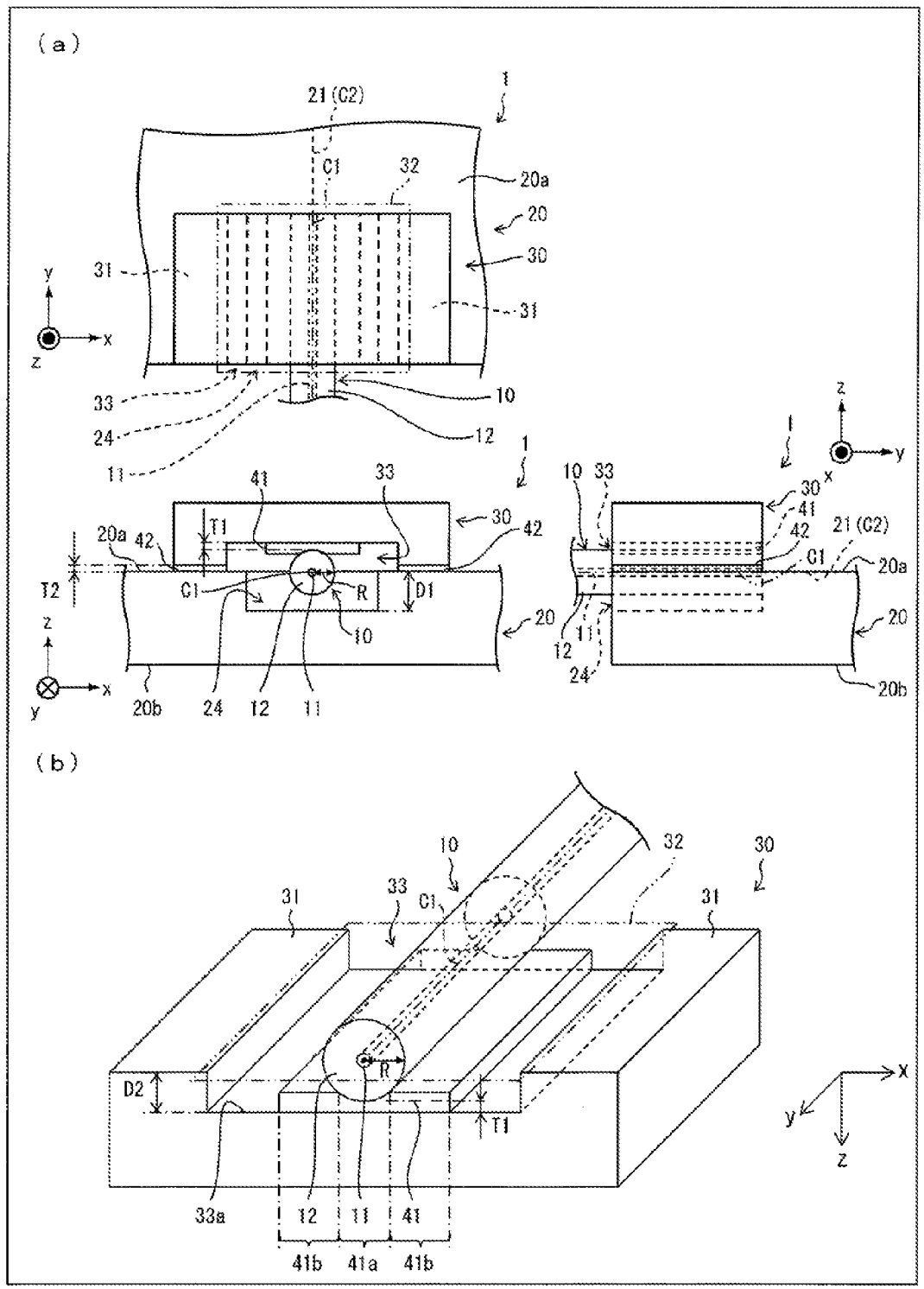
Figure 2:
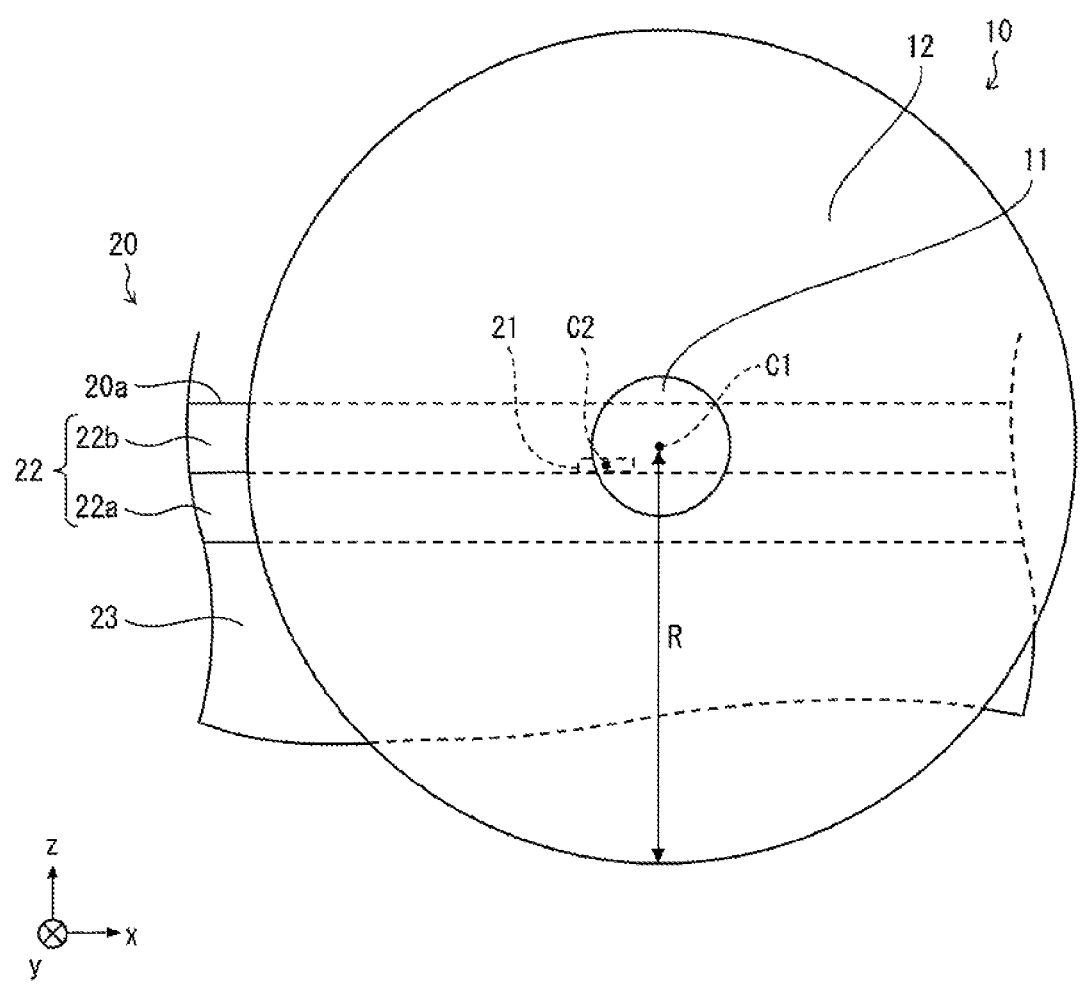
FIG. 2 is a cross view of a substrate waveguide and an optical fiber included in the optical device illustrated in FIG. 1.

The following describes an optical device 1 in accordance of Embodiment 1 of the present invention, with reference to FIGS. 1 and 2. (a) of FIG. 1 is a trihedral drawing of the optical device 1. In (a) of FIG. 1, a plan view, an elevation view, and a right side view are obtained in a case where the optical device 1 is viewed from a z-axis positive direction, a y-axis negative direction, and an x-axis positive direction, respectively. (b) of FIG. 1 is a perspective view of a holding member 30 included in the optical device 1. In (b) of FIG. 1, the holding member 30 is shown in a state into which the holding member 30 illustrated in (a) of FIG. 1 is turned by 180° about an x-axis. FIG. 2 is a cross view of an optical fiber 10 and a substrate waveguide 20 which are included in the optical device 1.

(General Description of Optical Device 1)

As illustrated in FIG. 1, the optical device 1 includes the optical fiber 10, the substrate waveguide 20, and the holding member 30. As illustrated in FIG. 2, the optical fiber 10 has a core 11 and a clad 12 surrounding the core 11. A part of the optical fiber 10 other than a tip of the optical fiber 10 is provided with a jacket (e.g., a jacket made of resin) which surrounds the clad 12.

The substrate waveguide 20 includes a core 21, a clad 22 in which the core 21 is buried, and a semiconductor layer 23 provided in a layer below the clad 22. An upper surface 20a of the substrate waveguide 20 is covered with the clad 22.

That is, the core 21 is provided near the upper surface 20a, out of two surfaces (the upper surface 20a and a lower surface 20b) of the substrate waveguide 20.

The clad 22 is constituted by a lower clad 22a and an upper clad 22b. The core 21 is provided on a surface of the lower clad 22a, and is surrounded by the lower clad 22a and the upper clad 22b which is deposited on the surface of the lower clad 22a.

For example, in a case where the semiconductor layer 23 is a semiconductor substrate made of silicon (Si), an SOI (silicon on insulator) substrate can be suitably used as a substrate for manufacturing the optical device 1. In this case, a Si support layer of the SOI substrate is used as the semiconductor layer 23, a BOX (buried oxide) layer of the SOI substrate is used as the lower clad 22a, and a Si active layer of the SOI substrate is used as the core 21. The upper clad 22b is obtained by processing (etching) the Si active layer into a pattern of the core 21 and then depositing silicon dioxide ($SiO_2$) or the like on the lower clad 22a and the core 21.

Note that a semiconductor constituting the core 21 is not limited to Si, and a dielectric constituting the clad 22 is not limited to $SiO_2$. For example, a compound semiconductor such as InP or GaAs can be employed as the semiconductor constituting the core 21, and SiN or the like can be employed as a dielectric material constituting the clad 22. As described in Patent Literature 2 as a beam conversion structure, $SiO_2$ can be employed as a material of the core 21, and the upper clad 22b of the clad 22 can be substituted by air.

The holding member 30 is placed on the upper surface 20a of the substrate waveguide 20 and is fixed via a resin layer 41 (a first resin layer recited in the claims). The holding member 30 holds the optical fiber 10 via a resin layer 42 (a second resin layer recited in the claims). A coefficient of thermal expansion of the resin layer 41 has a sign (a positive sign in Embodiment 1) which is identical to that of a coefficient of thermal expansion of the resin layer 42.

The optical device 1 is a device in which a mode of light traveling in the core 11 of the optical fiber 10 and a mode of light traveling in the core 21 of the substrate waveguide 20 are coupled to each other with a high coupling efficiency. Hereinafter, a coupling efficiency between a mode of light traveling in the core 11 of the optical fiber 10 and a mode of light traveling in the core 21 of the substrate waveguide 20 may be simply referred to as a coupling efficiency between the optical fiber 10 and the substrate waveguide 20.

As such, a relative position of the optical fiber 10 with respect to the substrate waveguide 20 is determined so that one end part of the core 11 and one end part of the core 21 face each other. The relative position is held by the holding member 30. Specifically, when a portion where the core 11 and the core 21 are in the vicinity of each other is viewed from a direction (a direction in which the core 21 extends: a y-axis direction) along a central axis C2 of the core 21, for example, the central axis C2 and a central axis C1 extend along each other, and the central axis C2 is contained in the core 11. According to this arrangement, coupling between the optical fiber 10 and the substrate waveguide 20 can be achieved with a high coupling efficiency. In Embodiment 1, the core 11 has a MFD (mode field diameter) of 9 μm, and the clad 12 has a radius R of 62.5 μm. In the substrate waveguide 20, the core 21 has a height (a length as measured along a z-axis direction) of 0.25 μm and has a width (a length as measured along the y-axis direction) of 0.5 μm.

Note that a relationship between the core 21 and the core 11 varies in accordance with thicknesses T1 and T2 of the respective resin layers 41 and 42. That is, the relationship between the core 21 and the core 11 varies in accordance with a change in temperature of an external environment of the optical device 1. As such, in defining the relationship between the core 21 and the core 11, it is preferable to set a reference temperature. The reference temperature may be a typical temperature (e.g., 25° C.) in an environment where the optical device 1 is used, or a temperature of an external environment of the optical device 1 at the time of manufacture of the optical device 1, that is, a temperature at a production line of the optical device 1. Further, in a case of an optical device which has a heat-generating part mounted thereon, the reference temperature may be set high (e.g., 50° C.). Embodiment 1 is discussed on the assumption that the reference temperature is 20° C. In the following description, the temperature of the external environment of the optical device 1 is 20° C., unless otherwise stated.

Note that each of the coordinate systems shown in FIGS. 1 and 2 is defined such that (1) out of directions along the central axes C1 and C2, a direction from the optical fiber 10 to the semiconductor waveguide 20 is a y-axis positive direction. Further, each of the coordinate systems shown in FIGS. 1 and 2 is defined such that (2) out of directions perpendicular to the y-axis direction, a direction which extends from the lower surface 20b to the upper surface 20a and along a normal line of the upper surface 20a of the substrate waveguide 20 is a z-axis positive direction. Furthermore, each of the coordinate systems shown in FIGS. 1 and 2 is defined such that (3) out of directions perpendicular to each of the y-axis direction and the z-axis direction, a direction which constitutes a right-handed orthogonal coordinate system with each of the y-axis direction and the z-axis direction is an x-axis positive direction.

(Arrangement of Optical Device 1)

The following description will discuss specific arrangements of the substrate waveguide 20 and the holding member 30, and an aspect in which the optical fiber 10 is held with use of the holding member 30.

(Substrate Waveguide 20)

The core 21 is provided on a plane which (i) is near the upper surface 20a of the substrate waveguide 20 and (ii) extends along (in Embodiment 1, is parallel to) the upper surface 20a. Since the upper clad 22b has a small thickness (2 μm in Embodiment 1), the core 21 appears to be on the same plane as the upper surface 20a of the substrate waveguide 20 in the side view of (a) of FIG. 1. In reality, the plane on which the core 21 is provided is located below the upper surface 20a (on a z-axis negative direction side).

As illustrated in (a) of FIG. 1, on the upper surface 20a (one of bottom surfaces, extending along an x-y plane, of the substrate waveguide 20 which one is on a z-axis positive direction side) of the substrate waveguide 20, a recess 24 (a first recess recited in the claims) is provided so as to extend from the upper surface 20a toward the lower surface 20b (one of the bottom surfaces, extending along the x-y plane, of the substrate waveguide 20 which one is on the z-axis negative direction side) (extend in a z-axis negative direction). The recess 24 has a depth D1 (a length of the recess 24 as measured along the z-axis direction) which is greater than the radius R of the optical fiber 10. That is, the radius R and the depth D1 satisfy a relation: R<D1. In Embodiment 1, the radius R is 62.5 μm and the depth D1 is 100 μm.

The recess 24, together with a recess 33 provided on a lower surface of the holding member 30, constitutes a continuous space in which a part of the optical fiber 10 is housed. In a plan view of the substrate waveguide 20 (see the plan view of (a) of FIG. 1), the recess 24 is provided so as to extend in a direction along the central axis C2 of the core 21 and have a width (a length of the recess 24 as measured along an x-axis direction) greater than a diameter of the optical fiber 10. In Embodiment 1, the recess 24 has a rectangular parallelepiped shape. Note, however, that the shape of the recess 24 is not limited to a rectangular parallelepiped, but can be any shape which allows a lower half of the optical fiber 10 to be housed in the recess 24.

As illustrated in the plan view and the elevation view of (a) of FIG. 1, the recess 24 is open not only to the upper surface 20a extending along the x-y plane but also to an end surface of the substrate waveguide 20 which end surface extends along a z-x plane. Accordingly, the recess 24 in Embodiment 1 can also be described as a recess which is formed by digging into the substrate waveguide 20 from the upper surface 20a toward the lower surface 20b (in the z-axis negative direction). Further, the recess 24 in Embodiment 1 can also be describes as a recess which is formed by digging into the substrate waveguide 20 from the end surface, which extends along the z-x plane, of the substrate waveguide 20 in a direction in which the core 21 extends (the y-axis positive direction).

In a plan view of the substrate waveguide 20, the recess 24 is located so that an opening of the recess 24 overlaps with an extension of the central axis C2 of the core 21. As such, a cross section which intersects with the central axis C2 of the core 21 (perpendicularly in Embodiment 1) is exposed on a side surface which extends along the z-x plane among three side surfaces which constitute inner walls of the recess 24.

The recess 24 thus arranged allows the optical fiber 10 to be disposed so that (i) the core 11 of the optical fiber 10 faces the core 21 which is exposed on the side surface and (ii) the central axis C1 extends along the central axis C2 of the core 21. This allows enhancing the coupling efficiency between the substrate waveguide 20 and the optical fiber 10.

Note that since the depth D1 is greater than the radius R, a lower half of the optical fiber 10 can be housed inside the recess 24, so that the optical fiber 10 can be located so as to contain the central axis C2 of the core 21. In order to secure a sufficient width for adjustment of the optical fiber 10 with respect to the z-axis direction, it is preferable that an outer circumferential part of the optical fiber 10 and a bottom part of the recess 24 be spaced apart from each other by the width of adjustment.

(Holding Member 30)

As illustrated in (b) of FIG. 1, on the lower surface (one of bottom surfaces, extending along the x-y plane, of the holding member 30 which one is on the z-axis negative direction side) of the holding member 30, a recess 33 (a second recess recited in the claims) is provided so as to extend from the lower surface toward an upper surface (one of the bottom surfaces, extending along the x-y plane, of the holding member 30 which one is on the z-axis positive direction side) (extend in the z-axis positive direction). Accordingly, the lower surface of the holding member 30 has an opening 32 of the recess 33. The recess 33 has a depth D2 (a length of the recess 33 as measured along the z-axis direction) which is smaller than the radius R of the optical fiber 10. That is, the radius R and the depth D2 satisfy a relation: R>D2. In Embodiment 1, the depth D2 is 50 µm. Note that the continuous space constituted by the recess 24 and the recess 33 has a height (a length of the continuous space as measured along the z-axis direction: D1+D2+T2) which is greater than a sum (2R+T1) of the diameter of the optical fiber 10 and the thickness T1 of the resin layer 41.

Note that in (b) of FIG. 1, the holding member 30 is shown in a state into which the holding member 30 illustrated in (a) of FIG. 1 is turned by 180° about the x-axis. Accordingly, a positional relationship between the upper surface and the lower surface of the holding member 30 is reversed in (b) of FIG. 1. Among lower surfaces of the holding member 30, a region within the recess 33 is referred to as a holding surface 33a and a region other than the recess 33 is referred to as a bonding surface 31.

Together with the recess 24, the recess 33 constitutes the continuous space which houses therein a part of the optical fiber 10. In a plan view of the holding member 30 as viewed from a side of the lower surface of the holding member 30 (from the z-axis negative direction side), the recess 33 has a width greater than the diameter (a length of the optical fiber 10 as measured along the x-axis direction) of the optical fiber 10. In Embodiment 1, the recess 33 has a rectangular parallelepiped shape. Note, however, that the shape of the recess 33 is not limited to a rectangular parallelepiped, but can be any shape which allows the optical fiber 10 to be housed in the recess 33.

As illustrated in (b) of FIG. 1, the recess 33 is open not only to the lower surface of the holding member 30 but also to an end surface of the holding member 30 which end surface extends along the z-x plane. Accordingly, the recess 33 in Embodiment 1 can also be described as a recess which is formed by digging into the holding member 30 from the lower surface toward the upper surface (in the z-axis positive direction) of the holding member 30. Further, the recess 33 in Embodiment 1 can also be described as a recess which is formed by digging into the holding member 30 in a direction along an extension of the core 21 (the y-axis direction), from the end surface of the holding member 30 which end surface extends along the z-x plane.

The holding member 30 and the optical fiber 10 are bonded and fixed to each other via the resin layer 41 which is provided between the holding surface 33a and the clad 12. It is preferable that at least a region of the holding surface 33a to which region the optical fiber 10 is fixed be a flat surface. In Embodiment 1, an entire region of the holding surface 33a is a flat surface.

In Embodiment 1, the resin layer 41 is provided in an entire section of the holding surface 33a along the y-axis direction. Alternatively, the resin layer 41 can be provided only in a part of the entire section of the holding surface 33a along the y-axis direction.

In Embodiment 1, the optical fiber 10 is fixed to the holding surface 33a so that an end surface of the optical fiber 10 (an end surface of the optical fiber 10 which end surface is on a side in the vicinity of the core 21 of the substrate waveguide 20) is in the same plane as an end surface of the holding member 30 which end surface is on a y-axis positive direction side. This arrangement allows fixing the end surface of the optical fiber 10 reliably to the holding surface 33a and easily understanding a position of the end surface of the optical fiber 10 (in particular, a position in the y-axis direction). The arrangement allows the holding member 30 to be disposed on the upper surface 20a by visual positioning in an early stage of an adjustment step S13 (described later).

Note that the end surface of the optical fiber 10 does not necessarily have to be in the same plane with the end surface of the holding member 30 on the y-axis positive direction side. That is, the end surface of the optical fiber 10 may protrude in the y-axis positive direction or recede in the y-axis negative direction, with respect to the end surface of the holding member 30 on the y-axis positive direction side.

The substrate waveguide 20 and the holding member 30 are bonded and fixed to each other via the resin layer 42 (the second resin layer recited in the claims) which is provided between the upper surface 20a of the substrate waveguide 20 and the bonding surface 31. In Embodiment 1, an entire region of the bonding surface 31 is bonded and fixed to the upper surface 20a. Alternatively, it is possible to employ an arrangement in which a part of the entire region of the bonding surface 31 is boned and fixed to the upper surface 20a. In Embodiment 1, the recess 33 illustrated in the drawings has a width greater than that of the recess 24. Alternatively, it is possible to employ an arrangement in which the recess 33 has a width equal to that of the recess 24, or an arrangement in which the recess 33 has a width smaller than that of the recess 24.

Note that a region in which the bonding surface 31 of the holding member 30 is fixed to the substrate waveguide 20 is not limited to the upper surface 20a. However, in order to enhance precision in adjustment of the central axis C1 of the core 11 with respect to the central axis C2 of the core 21, it is preferable that the region have a highly smooth surface, and a relationship between the region and the core 21 be maintained with high precision. In Embodiment 1, the upper surface 20a to which the holding member 30 is fixed is a flat surface which is (i) highly smooth among regions constituting the substrate waveguide 20 and (ii) parallel to a flat surface on which the core 21 is provided. The upper surface 20a is located in a position higher than the flat surface on which the core 21 is provided, by a distance (e.g., several μm) corresponding to a film thickness of the upper clad 22b. The film thickness of the upper clad 22b is controlled by a deposition device, so that a dimensional tolerance can be made small. The upper surface 20a therefore is a region whose relationship with the core 21 is maintained with high precision. Accordingly, the upper surface 20a is suitable as a region to which the bonding surface 31 is to be fixed.

A material of the holding member 30 is not particularly limited, and can be, for example, glass, ceramics, metal, or the like. In a case where a resin constituting the resin layer 42 (described later) is an ultraviolet curable resin, the holding member 30 is preferably made of a material having an ultraviolet transmitting property. From this viewpoint, the holding member 30 is preferably made of a borosilicate glass. Note that the borosilicate glass is suitable as a material of the holding member 30 also because of having a low coefficient of thermal expansion. The borosilicate glass is known as, for example, TEMPAX Float (a registered trademark in Japan) or BOROFLOAT (a registered trademark outside Japan).

As described above, the holding member 30 is fixed to the upper surface 20a of the substrate waveguide 20, and the optical fiber 10 is fixed to the holding surface 33a of the holding member 30.

When the optical device 1 thus arranged is viewed from a direction (the y-axis negative direction) along the central axis C2 of the core 21 of the substrate waveguide 20, the central axis C2 of the core 21 of the substrate waveguide 20 is contained within the core 11 of the optical fiber 10.

Embodiment 1 employs an arrangement in which no member is provided between the core 11 of the optical fiber 10 and the core 21 of the substrate waveguide 20. Alternatively, a mode modulator which enhances a coupling efficiency between the core 11 and the core 21 may be present between the core 11 and the core 21.

Embodiment 1 also employs an arrangement in which the lower surface of the holding member 30 has the recess 33 and the optical fiber 10 is bonded to the holding surface 33a in the recess 33. Note, however, that the lower surface of the holding member 30 does not have to have the recess 33. That is, the lower surface of the holding member 30 may be a flat surface, and the flat surface may have a protrusion on a part thereof.

(Effect of Optical Device 1)

In a case where a temperature of the external environment of the optical device 1 changes from that during manufacture of the optical device 1, each of the resin layer 41 and the resin layer 42 expands or shrinks in accordance with (i) a coefficient of thermal expansion of the each of the resin layer 41 and the resin layer 42 and (ii) the change in temperature of the external environment. In Embodiment 1, each of the coefficient of thermal expansion of the resin layer 41 and the coefficient of thermal expansion of the resin layer 42 has a positive value. As such, in accordance with an increase in temperature of the external environment, a volume of each of the resin layer 41 and the resin layer 42 increases. This increases the thickness T1 of the resin layer 41 and the thickness T2 of the resin layer 42.

The core 11 moves in a direction (the z-axis negative direction) from the upper surface 20a to the lower surface 20b of the substrate waveguide 20 as the thickness T1 of the resin layer 41 increases, and moves in a direction (the z-axis positive direction) from the lower surface 20b to the upper surface 20a of the substrate waveguide 20 as the thickness T2 of the resin layer 42 increases.

In a case where, for example, each of the coefficient of thermal expansion of the resin layer 41 and the coefficient of thermal expansion of the resin layer 42 has a negative value, the volume of each of the resin layer 41 and the resin layer 42 decreases in accordance with an increase in temperature of the external environment. This decreases the thickness T1 and the thickness T2.

The core 11 moves in a direction (the z-axis positive direction) from the lower surface 20b to the upper surface 20a of the substrate waveguide 20 as the thickness T1 of the resin layer 41 decreases, and moves in a direction (the z-axis negative direction) from the upper surface 20a to the lower surface 20b of the substrate waveguide 20 as the thickness T2 of the resin layer 42 decreases.

As described above, a direction in which the core of the optical fiber moves in accordance with an increase (or decrease) in thickness T1 of the resin layer 41 is opposite to a direction in which the core of the optical fiber moves in accordance with an increase (or decrease) in thickness T2 of the resin layer 42. Accordingly, in the optical device 1, misalignment of the core of the optical fiber with respect to the core of the substrate waveguide caused by a change in temperature of the external environment can be canceled out.

Further, in the optical device 1, the holding member 30, the resin layer 41, and the resin layer 42 are used in order to fix the optical fiber 10 to the substrate waveguide 20. A cost for employing the holding member 30, the resin layer 41, and the resin layer 42 is significantly lower than a cost for performing the shrink-fitting described in Patent Literature 1.

Therefore, the optical device 1 enables both (i) suppression of an increase in production cost and (ii) suppression of an increase in optical loss which increase is caused in accordance with a change in temperature of the external environment. Note that a change in volume of a resin layer is caused not only by a change in temperature of an external environment but also by a change in humidity of the external environment and a change over time of the resin layer. In the optical device 1, misalignment of the core of the optical fiber with respect to the core of the substrate waveguide due to a change in volume of each of the resin layers 41 and 42 can be suppressed. Accordingly, the optical device 1 enables suppression of an increase in optical loss which is caused in accordance with a change in humidity of the external environment and a change overtime of each of the resin layers 41 and 42.

In order to further enhance the coupling efficiency between the optical fiber 10 and the substrate waveguide 20, it is preferable that an entire region of the core 21 be contained within the core 11 and it is more preferable that the central axis C2 coincide with the central axis C1, when the core 21 is viewed from a direction along the central axis C2.

(Resin Layers 41 and 42)

Each of the resin layer 41 and the resin layer 42 is obtained by curing a liquid resin material. As the liquid resin material which has not been cured, a resin material which is known as an adhesive (e.g., a urethane resin, an epoxy resin, or the like) can be used suitably.

The liquid resin material can be classified into an ultraviolet curable type, a thermosetting type, a moisture curing type, and the like, depending on a mechanism of curing. The resin layer 41 and the resin layer 42 are each made of a resin material which can be any of an ultraviolet curable resin, a thermosetting resin, and a moisture curing resin.

As described later in the description of a manufacturing method, the resin material which constitutes the resin layer 42 is preferably a resin material which does not cure during the adjustment step S13 but quickly cures in a bonding step S14 which is performed after an end of an adjustment step S13. That is, the resin material constituting the resin layer 42 is preferably a resin material which can be cured quickly at a given timing. From this viewpoint, the resin material from which the resin layer 42 is formed is preferably an ultraviolet curable resin material.

Note that the resin material constituting the resin layer 41 and the resin material constituting the resin layer 42 have respective coefficients of thermal expansion which have an identical sign, and have respective volumes which are similarly correlated with a temperature of the external environment. In a case where each of the coefficients of thermal expansion has a positive value, each of the thickness T1 of the resin layer 41 and the thickness T2 of the resin layer 42 increases as the temperature increases. In a case where each of the coefficients of thermal expansion has a negative value, each of the thickness T1 of the resin layer 41 and the thickness T2 of the resin layer 42 decreases as the temperature increases. In a case where the coefficients of thermal expansion thus have an identical sign, the resin material constituting the resin layer 41 and the resin material constituting the resin layer 42 may be the same or different.

The thickness T1 of the resin layer 41 and the thickness T2 of the resin layer 42 are each preferably not less than 10 μm and not more than 30 μm. Note that the thickness T1 is defined as an average of thicknesses of the resin layer 41 in a contact portion 41a in a case where the resin layer 41 provided on the holding surface 33a is divided into the contact portion 41a which is a region in contact with the optical fiber 10 and a non-contact portion 41b which is a region other than the contact portion 41a. A thickness of the resin layer 41 in the non-contact portion 41b does not have to be taken into consideration since the thickness does not affect a position of the optical fiber 10 in the z-axis direction. The thickness T2 of the resin layer 42 is defined as an average gap which is obtained by averaging gaps between the bonding surface 31 of the holding member 30 and the upper surface 20a of the substrate waveguide 20 in an x-y plane. In Embodiment 1, the thickness T1 has an average value of 15 μm, and the thickness T2 is 15 μm. Note that a gap between the holding surface 33a and a part of the side surface of the optical fiber 10 which part is in the closest vicinity of the holding surface 33a is preferably as uniform as possible along the y-axis direction. A gap between the bonding surface 31 of the holding member 30 and the upper surface 20a of the substrate waveguide 20 is preferably as uniform as possible in the x-y plane.

In a case where the thickness T1 of the resin layer 41 and the thickness T2 of the resin layer 42 are each not less than 10 μm, the resin layer 41 and the resin layer 42 can each exhibit sufficient fixing strength. In a case where the thickness T1 and the thickness T2 are each not more than 30 μm, it is possible to reduce amounts of change in the thickness T1 and the thickness T2 caused by a change in temperature of the external environment. Accordingly, the arrangement described above enables further suppression of misalignment of the core of the optical fiber with respect to the core of the substrate waveguide which misalignment is caused by a change in temperature of the external environment.

The thickness T2 of the resin layer 42 is preferably equal to the thickness T1 of the resin layer 41. Note that in a case where a difference between the thickness T1 and the thickness T2 is within a range of tolerance in a manufacturing process, the thickness T1 and the thickness T2 can be deemed to be substantially equal to each other.

According to the arrangement above, an amount of change in thickness T1 of the resin layer 41 caused by a change in temperature of the external environment is approximately equal to an amount of change in thickness T2 of the resin layer 42 caused by the change in temperature of the external environment. This allows sufficiently preventing an increase in optical loss which increase is caused in accordance with the change in temperature of the external environment.

The resin material (a material recited in the claims) constituting the resin layer 41 is preferably identical to the resin material (a material recited in the claims) constituting the resin layer 42.

According to this arrangement, a coefficient of expansion of the resin material constituting the resin layer 41 is equal to a coefficient of expansion of the resin material constituting the resin layer 42. Accordingly, an amount of change in thickness T1 caused by a change in temperature of the external environment is approximately equal to an amount of change in thickness T2 caused by the change in temperature of the external environment. This allows sufficiently preventing an increase in optical loss which increase is caused in accordance with the change in temperature of the external environment. In particular, in a case where the thickness T1 is equal to the thickness T2, an amount of change in thickness T1 is equal to an amount of change in thickness T2. In this case, it is possible to completely prevent an increase in optical loss which increase is caused in accordance with a change in temperature of the external environment.

(Modified Example of Optical Fiber 10)

Figure 3:
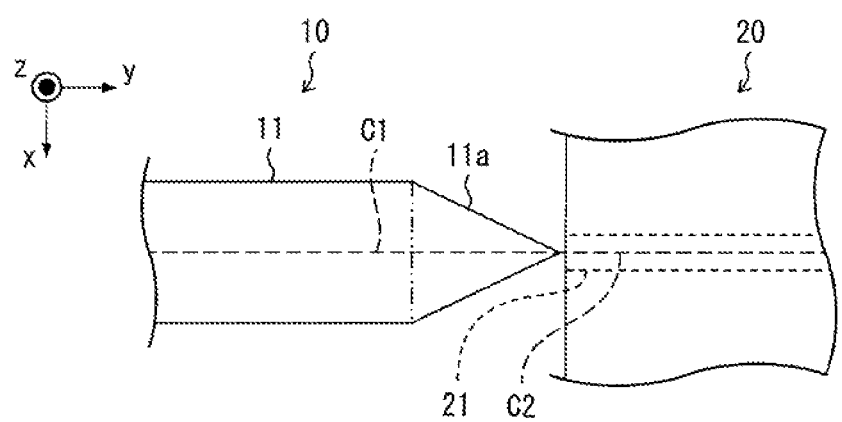
FIG. 3 is a plan view of a modified example of the optical fiber included in the optical device illustrated in FIG. 1.

A lensed fiber 10, which is a modified example of the optical fiber 10 included in the optical device 1, is illustrated in FIG. 3. That is, an optical device 1 in accordance with the modified example is obtained by replacing the optical fiber 10 with a lensed fiber 10. Although the lensed fiber is a type of optical fiber, the Description makes the following distinction: an optical fiber refers to an optical fiber whose end part is a flat surface, and a lensed fiber is an optical fiber whose end part has a stereoscopic shape instead of having a flat surface.

FIG. 3 is a plan view of the lensed fiber 10. FIG. 3 omits a clad 12 of the lensed fiber 10, and shows a case in which a core 21 of a substrate waveguide 20 coincides with a core 11 of the lensed fiber 10.

As illustrated in FIG. 3, an end part of the lensed fiber 10 which end part is in the vicinity of the core 21 is processed to have a cone shape. The end part thus processed to have the cone shape serves as a mode conversion section 11a which converts a mode of light traveling in the core 11 so as to approximate the mode to a mode of light traveling in the core 21.

By employing the lensed fiber 10 as the optical fiber 10 of the optical device 1, it is possible to further enhance the coupling efficiency between the substrate waveguide 20 and the optical fiber 10, and suppress an increase in optical loss in the optical device 1.

Note that misalignment of the core 11 with respect to the core 21 affects the coupling efficiency between the substrate waveguide 20 and the lensed fiber 10 to a greater extent than a coupling efficiency between the substrate waveguide 20 and the optical fiber 10 (the optical fiber 10 which does not include the mode conversion section 11a) illustrated in FIG. 1. In other words, the coupling efficiency between the substrate waveguide 20 and the lensed fiber 10 has a smaller tolerance as compared with the coupling efficiency between the substrate waveguide 20 and the optical fiber 10. Accordingly, the optical device 1 of the modified Example can be suitably used as an optical device in which a substrate waveguide and a lensed fiber are optically coupled to each other.

Furthermore, since the optical device 1 of the modified example enables suppression of misalignment of the core 11 with respect to the core 21 caused by a change in temperature of the external environment, it is possible to suppress the misalignment to or below a desired level in a wide temperature range. Accordingly, although the lensed fiber 10 is employed in the optical device 1, the optical device 1 of the modified example enables suppression of an increase in optical loss in a wide temperature range.

Note that the mode conversion section 11a is not limited to a cone shape, but can be a shape of a hemisphere, a convex lens, or a wedge.

Note that sizes of the optical device 1 described in Embodiment 1 are merely examples of an arrangement of the optical device 1, and the present invention is not limited to the described sizes. These sizes can be determined as appropriate in accordance with the optical fiber 10 and the substrate waveguide 20 constituting the optical device 1.

[Manufacturing Method]

Figure 4:
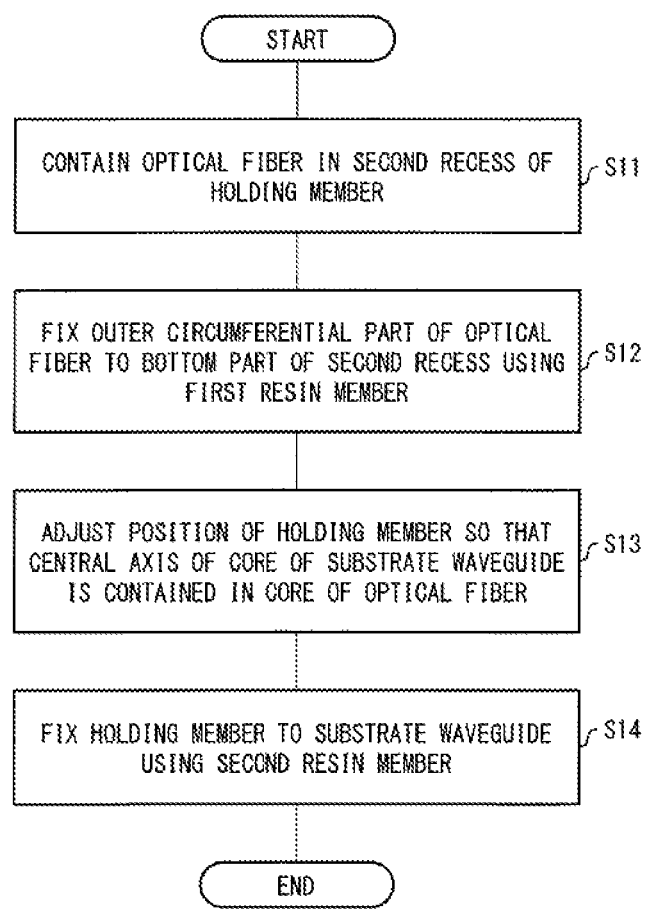
FIG. 4 is a flowchart showing a method for manufacturing the optical device illustrated in FIG. 1.

With reference to FIG. 4, a method for manufacturing the optical device 1 illustrated in FIGS. 1 and 2 will be discussed. FIG. 4 is a flowchart showing a part of the method for manufacturing the optical device 1. In the following description, the manufacturing method will be described on the assumption that the substrate waveguide 20 and the holding member 30 have already formed therein the recess 24 and the recess 33, respectively. As illustrated in FIG. 4, the manufacturing method includes the following steps S11 through S14.

Housing step S11: One end part of the optical fiber 10 is housed in the recess 33 of the holding member 30.

Bonding step S12: The holding member 30 and the optical fiber 10 are bonded and fixed to each other via the resin layer 41 which is provided between the holding surface 33a of the holding member 30 and the clad 12 of the optical fiber 10. The bonding step S12 corresponds to a first bonding step which is recited in the claims.

Adjustment step S13: A position of the holding member 30 is adjusted with respect to the substrate waveguide 20 so that the core 11 of the optical fiber 10 faces the core 21 of the substrate waveguide 20 when viewed from a direction (the y-axis negative direction in the coordinate system shown in FIG. 2) along the central axis C2 of the core 21 of the substrate waveguide 20.

Bonding step S14: While a state achieved by the adjustment performed in the adjustment step S13 is maintained, the substrate waveguide 20 and the holding member 30 are bonded and fixed to each other via the resin layer 42 which is provided between the upper surface 20a of the substrate waveguide 20 and the bonding surface 31 of the holding member 30. The bonding step S14 corresponds to a second bonding step which is recited in the claims.

Each of the resin layers 41 and 42 is formed by applying and then curing a liquid resin material. A timing of applying the resin material for the resin layer 41 is preferably prior to the housing step S11, but may be subsequent to the housing step S11. A timing of applying the resin material for the resin layer 42 is preferably prior to the adjustment step S13, but may be subsequent to the adjustment step S13.

In order to cure the resin material in the bonding step S12, a curing method can be employed can be determined in accordance with a type of the resin material. For example, in a case where the resin material is a thermosetting resin, the resin material can be heated. In a case where the resin material is an ultraviolet curable resin, the resin material can be irradiated with ultraviolet light. In a case where the resin material is a moisture curing resin, the resin material can be left to stand in an environment containing moisture for a predetermined time.

The same applies to a case in which the second resin material is cured in the bonding step S14. Note that in a case where the ultraviolet curable resin is used as the second resin material, it is desirable that a material having an ultraviolet transmitting property is used as a material of the holding member 30. According to this arrangement, the second resin material can be cured by being irradiated with ultraviolet light from a side (the z-axis positive direction side in the coordinate system shown in FIG. 1) of the upper surface of the holding member 30.

The housing step S11 and the bonding step S12 are preferably carried out in a state where the holding member 30 is as illustrated in (b) of FIG. 1, that is, in a state where the z-axis positive direction is vertically downward. This is because the housing step S11 and the bonding step S12 can be carried out more easily in the state illustrated in (b) of FIG. 1 than in the state illustrated in (a) of FIG. 1.

In the adjustment step S13, a coupling efficiency of the optical fiber 10 to the substrate waveguide 20 is evaluated by causing light to enter the other end part (an end part of the optical fiber 10 on a side opposite to a side which is housed in the recess 33 of the holding member 30) of the optical fiber 10 and detecting an intensity of light emitted from one end part (an end part of the substrate waveguide 20 which end part is not in the vicinity of the other end part of the optical fiber 10) of the substrate waveguide 20. While the coupling efficiency is monitored in a state where the substrate waveguide 20 is fixed to a stage, the holding member 30 is moved in each of the x-axis direction, the y-axis direction, and the z-axis direction independently. This allows adjusting the optical fiber 10 into a position which allows achieving a satisfactory coupling efficiency.

In moving the holding member 30, use of a collet (e.g., a round collet) which holds the holding member 30 by vacuum contact with the holding member 30 allows the holding member 30 to be moved with high precision and also be reliably stopped at a given position.

Until the bonding step S14 is completed, that is, until the second resin material cures, the holding member 30 is made to remain still in the position into which the holding member 30 is adjusted in the adjustment step S13.

Embodiment 21

Figure 5:
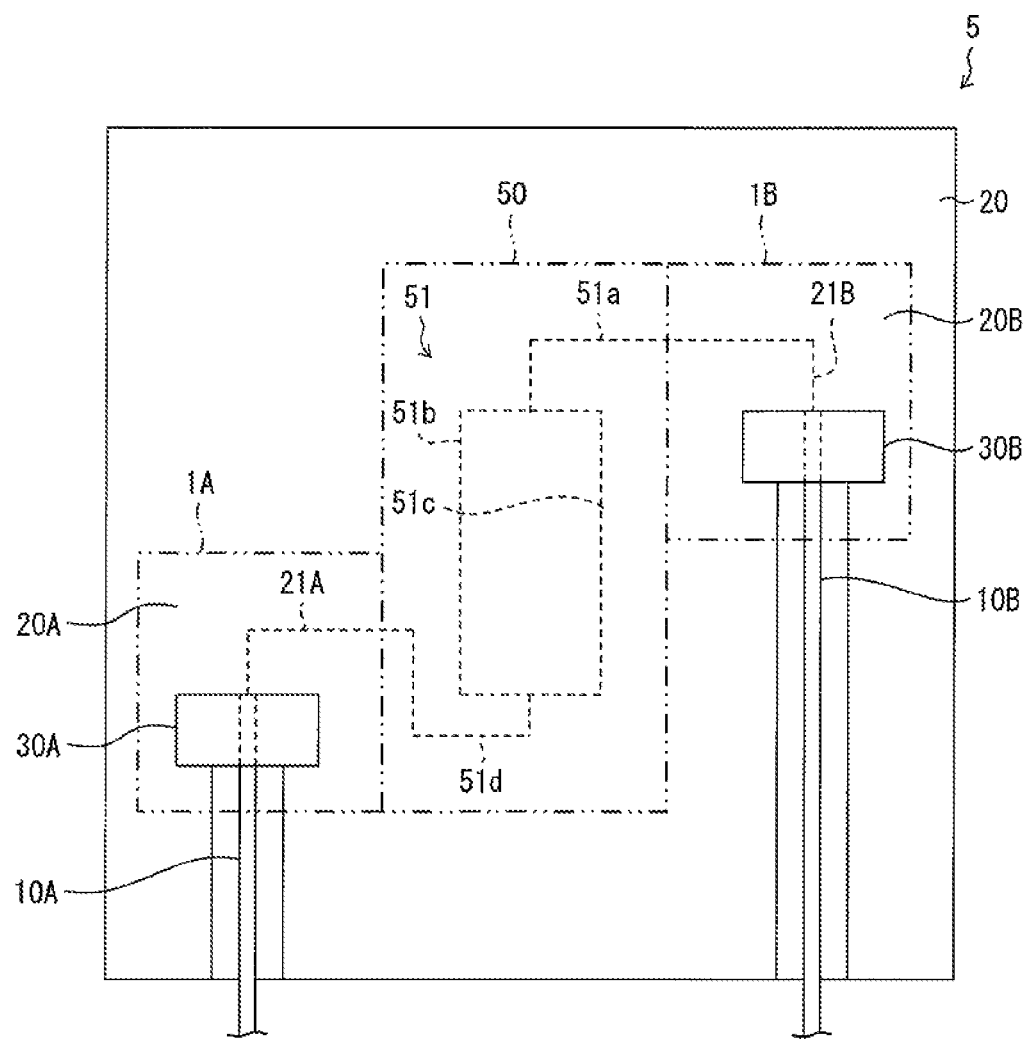
FIG. 5 is a plan view of an optical modulator in accordance with Embodiment 2 of the present invention.

The following description will discuss an optical modulator 5 in accordance with Embodiment 2 of the present invention, with reference to FIG. 5. The optical modulator 5 includes an optical modulation device 50, an optical device 1 which is disposed at a stage previous to the optical modulation device 50, and an optical device 1 which is disposed at a stage subsequent to the optical modulation device 50.

In order to distinguish between the optical devices 1 disposed at the stage previous to and the stage subsequent to the optical modulation device 50, the optical device 1 disposed at the stage previous to the optical modulation device 50 is referred to as an optical device 1A, and the optical device 1 disposed at the stage subsequent to the optical modulation device 50 is referred to as an optical device 1B. The optical devices 1A and 1B and the optical modulation device 50 are manufactured by a common SOI substrate. Accordingly, the optical devices 1A and 1B and the optical modulation device 50 share (i) a clad 22 constituted by a lower clad 22a and an upper clad 22b and (ii) a semiconductor layer 23. The clad 22 covers a surface of each of the substrate waveguides 20A and 20B and a surface of the optical modulation device 50.

The optical modulation device 50 includes a core 51, the clad 22 in which the core 51 is buried, and the semiconductor layer 23 which is provided in a layer below the clad 22. One surface of the optical modulation device 50 is covered with the clad 22. The optical modulation device 50 can also be regarded as one aspect of the substrate waveguide 20. The core 51 is formed by processing (etching) a Si active layer of the SOI substrate, similarly as the core 21 of the substrate waveguide 20 of the optical device 1 illustrated in FIG. 1.

As illustrated in FIG. 5, the core 51 of the optical modulation device 50 is constituted by a light input section 51d, light interference sections 51b and 51c, and a light output section 51a. The core 51 thus arranged constitutes a Mach-Zehnder optical modulator. Each of the light interference sections 51b and 51c is provided with a pair of electrodes for the light interference sections 51b and 51c to modulate light which travels in the each of the light interference sections 51b and 51c (not illustrated in FIG. 5).

The substrate waveguide 20A of the optical device 1A has a core 21A which is connected to the light input section 51d constituting one end part of the optical modulation device 50.

The substrate waveguide 20B of the optical device 1B has a core 21B which is connected to the light output section 51a constituting the other end part of the optical modulation device 50.

In the optical modulator 5 thus arranged, the optical devices 1A and 1B are employed as arrangements for coupling the optical modulation device 50 to optical fibers 10A and 10B, respectively. Accordingly, it is possible to provide an optical modulator which enables both (i) suppression of an increase in production cost and (ii) suppression of an increase in optical loss which increase is caused in accordance with a change in temperature of an external environment.

An optical device in accordance with one aspect of the present invention is an optical device including: a substrate waveguide having an upper surface on which a first recess is provided; a holding member disposed on the upper surface of the substrate waveguide; and an optical fiber having a core, a part of the optical fiber being contained in the first recess so that the core faces a core of the substrate waveguide, the holding member and the optical fiber being bonded and fixed to each other via a first resin layer which is provided between a surface of the optical fiber and a holding surface which is a part of a lower surface of the holding member, the substrate waveguide and the holding member being bonded and fixed to each other via a second resin layer which (i) is provided between the upper surface of the substrate waveguide and a region of the lower surface of the holding member which region is outside the holding surface and (ii) has a coefficient of thermal expansion having a sign identical to that of a coefficient of thermal expansion of the first resin layer.

In a case where a temperature of an external environment of the optical device changes from that during manufacture of the optical device, a volume of each of the first resin layer and the second resin layer expands or shrinks in accordance with the change in temperature. The first resin layer and the second resin layer have respective coefficients of thermal expansion which have an identical sign. That is, the respective volumes of the first resin layer and the second resin layer are similarly correlated with a temperature of the external environment. For example, in a case where the first resin layer and the second resin layer are each made of a resin whose volume expands in accordance with a temperature increase (in a case where each of the coefficients of thermal expansion of the first resin layer and the second resin layer has a positive sign), each of the volumes of the first resin layer and the second resin layer expands in accordance with an increase in temperature of the external environment. This increases a thickness of the first resin layer and a thickness of the second resin layer.

The core of the optical fiber moves in a direction from the upper surface to the lower surface of the substrate waveguide as the thickness of the first resin layer increases, and moves in a direction from the lower surface to the upper surface of the substrate waveguide as the thickness of the second resin layer increases.

In a case where, for example, each of the first resin layer and the second resin layer is made of a resin whose volume shrinks in accordance with a temperature increase (in a case where each of the coefficients of thermal expansion of the first resin layer and the second resin layer has a negative sign), each of the volumes of the first resin layer and the second resin layer decreases in accordance with an increase in temperature of the external environment. This decreases the thickness of the first resin layer and the thickness of the second resin layer.

The core of the optical fiber moves in a direction from the lower surface to the upper surface of the substrate waveguide as the thickness of the first resin layer decreases, and moves in a direction from the upper surface to the lower surface of the substrate waveguide as the thickness of the second resin layer decreases.

As described above, a direction in which the core of the optical fiber moves in accordance with an increase (or decrease) in thickness of the first resin layer is opposite to a direction in which the core of the optical fiber moves in accordance with an increase (or decrease) in thickness of the second resin layer. As such, according to the arrangement above, misalignment of the core of the optical fiber with respect to the core of the substrate waveguide caused by a change in temperature of the external environment can be canceled out.

Further, in the optical device, the holding member, the first resin layer, and the second resin layer are used in order to fix a position of the optical fiber to the substrate waveguide. A cost for employing the holding member, the first resin layer, and the second resin layer is significantly lower than a cost for performing the shrink-fitting described in Patent Literature 1.

Therefore, according to the arrangement above, it is possible to provide an optical device which enables both (i) suppression of an increase in production cost and (ii) suppression of an increase in optical loss which increase is caused in accordance with a change in temperature of an external environment.

Further, a method, in accordance with one aspect of the present invention, for manufacturing an optical device is a method for manufacturing an optical device which includes: a substrate waveguide having an upper surface on which a first recess is provided; a holding member disposed on the upper surface of the substrate waveguide; and an optical fiber having a core, a part of the optical fiber being contained in the first recess so that the core faces a core of the substrate waveguide, said method comprising: a first bonding step of bonding and fixing the holding member and the optical fiber to each other via a first resin layer which is provided between a surface of the optical fiber and a holding surface which is a part of a lower surface of the holding member; and a second bonding step of bonding and fixing the substrate waveguide and the holding member to each other via a second resin layer which (i) is provided between the upper surface of the substrate waveguide and a region of the lower surface of the holding member which region is outside the holding surface and (ii) has a coefficient of thermal expansion having a sign identical to that of a coefficient of thermal expansion of the first resin layer.

According to the arrangement above, the method, in accordance with one aspect of the present invention, for manufacturing an optical device provides a similar effect as an optical device in accordance with one aspect of the present invention.

Further, an optical device in accordance with one aspect of the present invention is arranged such that a thickness of the first resin layer and a thickness of the second resin layer are each not less than 10 µm and not more than 30 µm.

In a case where the thickness of the first resin layer and the thickness of the second resin layer are each not less than 10 µm, the first resin layer and the second resin layer can each exhibit sufficient fixing strength. In a case where the thickness of the first resin layer and the thickness of the second resin layer are each not more than 30 µm, it is possible to reduce an amount of change in thickness of the first resin layer and an amount of change in thickness of the second resin layer which are caused by a change in temperature of the external environment. Accordingly, the arrangement above enables further suppression of misalignment of the core of the optical fiber with respect to the core of the substrate waveguide which misalignment is caused by a change in temperature of the external environment.

Further, an optical device in accordance with one aspect of the present invention is arranged such that the first resin layer has a thickness substantially equal to that of the second resin layer.

According to the arrangement above, an amount of change in thickness of the first resin layer caused by a change in temperature of the external environment is approximately equal to an amount of change in thickness of the second resin layer caused by the change in temperature of the external environment. This allows sufficiently suppressing an increase in optical loss which increase is caused in accordance with the change in temperature of the external environment. Note that in a case where a difference between the thickness of the first resin layer and the thickness of the second resin layer is within a range of tolerance in a manufacturing process, the respective thicknesses of the first resin layer and the second resin layer can be deemed to be substantially equal to each other.

Further, an optical device in accordance with one aspect of the present invention is arranged such that a material of the first resin layer is identical to that of the second resin layer.

According to this arrangement, a coefficient of expansion of the material of the first resin layer is equal to a coefficient of expansion of the material of the second resin layer. Accordingly, an amount of change in thickness of the first resin layer caused by a change in temperature of the external environment is approximately equal to an amount of change in thickness of the second resin layer caused by the change in temperature of the external environment. This allows sufficiently suppressing an increase in optical loss which increase is caused in accordance with the change in temperature of the external environment.

Further, an optical device in accordance with one aspect of the present invention is arranged such that a material of the holding member has an ultraviolet transmitting property.

According to the arrangement above, the second resin layer can be irradiated with ultraviolet light from a side of one surface of the substrate waveguide. This allows using an ultraviolet curable resin material as the material of the second resin layer. As such, a heating device for heating is unnecessary, so that the second resin layer can be cured more easily as compared with a case in which a thermosetting resin material is used as a material of the second resin layer. Furthermore, a time required for curing can be shortened as compared with a case in which a moisture curing resin material is used as a material of the second resin layer.

Further, an optical device in accordance with one aspect of the present invention is arranged such that the core of the substrate waveguide is contained in the core of the optical fiber when viewed from a direction in which the core of the substrate waveguide extends.

The arrangement above allows enhancing a coupling efficiency between the substrate waveguide and the optical fiber.

Further, an optical device in accordance with one aspect of the present invention is arranged such that: the lower surface of the holding member has a second recess which, together with the first recess of the substrate waveguide, constitutes a continuous space; a part of the optical fiber is contained in the space; the first recess has a depth greater than a radius of the optical fiber; and the second recess has a depth smaller than the radius of the optical fiber.

The arrangement above allows a central axis of the core of the substrate waveguide and a central axis of the core of the optical fiber to coincide with each other. This allows further enhancing the coupling efficiency between the substrate waveguide and the optical fiber.

Further, an optical device in accordance with one aspect of the present invention is arranged such that the optical fiber is a lensed fiber.

The arrangement above allows further enhancing the coupling efficiency between the substrate waveguide and the optical fiber. Furthermore, the arrangement allows suppression of deterioration of the coupling efficiency not only at a certain temperature but also in a wide temperature range.

Further, an optical modulator in accordance with one aspect of the present invention is an optical modulator including: an optical modulation device having (i) a core which constitutes a Mach-Zehnder optical modulator and (ii) a clad in which the core is buried, one surface of the optical modulation device being covered with the clad; a first optical device which is disposed at a stage previous to the optical modulation device and includes a substrate waveguide having a core connected to one end of the core of the optical modulation device; and a second optical device which is disposed at a stage subsequent to the optical modulation device and includes a substrate waveguide having a core connected to the other end of the core of the optical modulation device.

According to the arrangement above, an optical device in accordance with one aspect of the present invention is employed as an arrangement for coupling between the optical modulation device and the optical fiber. This allows providing an optical modulator which enables both (i) suppression of an increase in production cost and (ii) suppression of an increase in optical loss which increase is caused by a change in temperature of an external environment.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST 1, 1A, and 1B: optical device
10: optical fiber
11: core
12: clad
20: substrate waveguide
20a: upper surface
20b: lower surface
21: core
22: clad
23: semiconductor layer
24: recess (first recess)
30: holding member
31: bonding surface (region of lower surface outside a second recess)
33: recess (second recess)
33a: holding surface (region of lower surface within second recess)
41: resin layer (first resin layer)
42: resin layer (second resin layer)
5: optical modulator
50: optical modulation device
51: core

The invention claimed is:
1. An optical device comprising:
a substrate waveguide having an upper surface on which a first recess is provided;
a holding member disposed on the upper surface of the substrate waveguide; and
an optical fiber having a core, a part of the optical fiber being contained in the first recess so that the core faces a core of the substrate waveguide,
the holding member and the optical fiber being bonded and fixed to each other via a first resin layer which is provided between a surface of the optical fiber and a holding surface which is a part of a lower surface of the holding member,
the substrate waveguide and the holding member being bonded and fixed to each other via a second resin layer which (i) is provided between the upper surface of the substrate waveguide and a region of the tower surface of the holding member which region is outside the holding surface and (ii) has a coefficient of thermal expansion having a sign identical to that of a coefficient of thermal expansion of the first resin layer.

2. The optical device as set forth in claim 1, wherein a thickness of the first resin layer and a thickness of the second resin layer are each not less than 10 μm and not more than 30 μm.

3. The optical device as set forth in claim 1, wherein the first resin layer has a thickness substantially equal to that of the second resin layer.

4. The optical device as set forth in claim 1, wherein a material of the first resin layer is identical to that of the second resin layer.

5. The optical device as set forth in claim 1, wherein a material of the holding member has an ultraviolet transmitting property.

6. The optical device as set forth in claim 1, wherein the core of the substrate waveguide is contained in the core of the optical fiber when viewed from a direction in which the core of the substrate waveguide extends.

7. The optical device as set forth in claim 1, wherein:
the lower surface of the holding member has a second recess which, together with the first recess of the substrate waveguide, constitutes a continuous space;
a part of the optical fiber is contained in the space;
the first recess has a depth greater than a radius of the optical fiber; and
the second recess has a depth smaller than the radius of the optical fiber.

8. The optical device as set forth in claim 1, wherein the optical fiber is a lensed fiber.

9. An optical modulator comprising:
an optical modulation device having a core which constitutes a Mach-Zehnder optical modulator;
a first optical device which is an optical device recited in claim 1 and is disposed at a stage previous to the optical modulation device; and
a second optical device which is an optical device recited in claim 1 and is disposed at a stage subsequent to the optical modulation device.

10. The optical device as set forth in claim 1, wherein:
the lower surface of the holding member has a second recess which, together with the first recess of the substrate waveguide, constitutes a continuous space; and
a part of the optical fiber is contained in the continuous space in a state in which the part of the optical fiber is spaced apart from a side wall of the second recess.

11. A method for manufacturing an optical device,
said optical device including:
a substrate waveguide having an upper surface on which a first recess is provided;
a holding member disposed on the upper surface of the substrate waveguide; and an optical fiber having a core, a part of the optical fiber being contained in the first recess so that the core faces a core of the substrate waveguide, said method comprising:

a first bonding step of bonding and fixing the holding member and the optical fiber to each other via a first resin layer which is provided between a surface of the optical fiber and a holding surface which is a part of a lower surface of the holding member; and a second bonding step of bonding and fixing the substrate waveguide and the holding member to each other via a second resin layer which (i) is provided between the upper surface of the substrate waveguide and a region of the lower surface of the holding member which region is outside the holding surface and (ii) has a coefficient of thermal expansion having a sign identical to that of a coefficient of thermal expansion of the first resin layer.

* * * * *